US009548871B2

(12) United States Patent
Johnson

(10) Patent No.: US 9,548,871 B2
(45) Date of Patent: Jan. 17, 2017

(54) SYSTEMS AND METHODS FOR MASTER ARBITRATION

(71) Applicant: General Electric Company, Schenectady, NY (US)

(72) Inventor: Mark Allen Johnson, Plano, TX (US)

(73) Assignee: General Electric Company, Schenectady, NY (US)

( * ) Notice: Subject to any disclaimer, the term of this patent is extended or adjusted under 35 U.S.C. 154(b) by 340 days.

(21) Appl. No.: 14/196,284

(22) Filed: Mar. 4, 2014

(65) Prior Publication Data

US 2014/0258573 A1   Sep. 11, 2014

Related U.S. Application Data

(60) Provisional application No. 61/774,560, filed on Mar. 7, 2013.

(51) Int. Cl.
*G06F 13/364* (2006.01)
*H04L 12/42* (2006.01)
*H04L 12/40* (2006.01)
*G11B 19/28* (2006.01)

(52) U.S. Cl.
CPC ......... *H04L 12/42* (2013.01); *H04L 12/40013* (2013.01); *H04L 12/40084* (2013.01); *G11B 19/28* (2013.01)

(58) Field of Classification Search
CPC .............. H04L 12/42; H04L 12/40013; H04L 12/4008; G11B 19/284
USPC ........................................................ 710/110
See application file for complete search history.

(56) References Cited

U.S. PATENT DOCUMENTS

| | | | | |
|---|---|---|---|---|
| 3,974,524 A * | 8/1976 | Griffiths | ................. | G11B 20/16 360/75 |
| 4,300,100 A * | 11/1981 | Marchelli | ............ | H03K 21/406 327/2 |
| 4,570,265 A * | 2/1986 | Thro | ........................ | H04B 7/06 375/130 |
| 4,598,257 A * | 7/1986 | Southard | ................... | H03L 7/07 331/14 |
| 4,677,614 A * | 6/1987 | Circo | ..................... | H04J 3/0641 370/222 |
| 4,860,006 A * | 8/1989 | Barall | ................... | H04L 12/403 370/447 |

(Continued)

FOREIGN PATENT DOCUMENTS

| EP | 0237839 A2 | 9/1987 |
|---|---|---|
| EP | 1921801 A2 | 5/2008 |

OTHER PUBLICATIONS

Search Report and Written Opinion from corresponding PCT Application No. PCT/US2014/021041 dated May 20, 2014.

*Primary Examiner* — Paul R Myers
(74) *Attorney, Agent, or Firm* — General Electric Company

(57) ABSTRACT

A power system is provided. The power system includes a communications bus and a plurality of modules communicatively coupled to the communications bus. Each of the plurality of modules is configured to continuously monitor the communications bus, transmit a modulated signal at a predetermined frequency when the module detects an incoherent signal on the communications bus, become a master module when the module detects a coherent signal at the predetermined frequency on the communications bus, and cease transmitting the modulated signal when the coherent signal is not detected after a period of time.

20 Claims, 3 Drawing Sheets

(56) References Cited

U.S. PATENT DOCUMENTS

| | | | | |
|---|---|---|---|---|
| 5,216,654 A * | 6/1993 | Itoh | G11B 27/10 | 360/137 |
| 5,390,326 A * | 2/1995 | Shah | G06F 11/2007 | 370/222 |
| 5,577,075 A * | 11/1996 | Cotton | G06F 1/04 | 370/516 |
| 5,623,495 A * | 4/1997 | Eng | H04L 49/3081 | 370/338 |
| 5,706,278 A * | 1/1998 | Robillard | H04L 12/40156 | 370/222 |
| 5,751,220 A | 5/1998 | Ghaffari | | |
| 5,835,481 A * | 11/1998 | Akyol | H04L 12/4608 | 370/216 |
| 5,982,652 A | 11/1999 | Simonelli et al. | | |
| 6,038,623 A * | 3/2000 | Schutte | G06F 13/4045 | 710/100 |
| 6,061,730 A * | 5/2000 | Billings | H04L 12/44 | 709/200 |
| 6,343,331 B1 * | 1/2002 | Stirling | G06F 12/0669 | 709/251 |
| 6,363,416 B1 * | 3/2002 | Naeimi | H04L 41/30 | 709/209 |
| 6,396,170 B1 | 5/2002 | Laufenberg et al. | | |
| 6,493,243 B1 * | 12/2002 | Real | H02J 9/062 | 307/66 |
| 7,421,478 B1 * | 9/2008 | Muchow | G06F 9/44505 | 709/209 |
| 8,938,516 B1 * | 1/2015 | Thathapudi | H04L 12/4641 | 709/208 |
| 2004/0075600 A1 * | 4/2004 | Vera | H02J 1/102 | 341/166 |
| 2004/0117510 A1 * | 6/2004 | Arimilli | G06F 15/167 | 709/253 |
| 2005/0043859 A1 | 2/2005 | Tsai et al. | | |
| 2005/0062499 A1 * | 3/2005 | Magal | G06F 13/387 | 326/86 |
| 2005/0237926 A1 * | 10/2005 | Cheng | H04L 43/0817 | 370/216 |
| 2006/0072624 A1 * | 4/2006 | Akita | H04L 12/437 | 370/503 |
| 2006/0203714 A1 * | 9/2006 | Wessels | H04L 12/2803 | 370/216 |
| 2007/0040657 A1 * | 2/2007 | Fosler | H02J 1/08 | 340/333 |
| 2007/0183360 A1 * | 8/2007 | Arunan | H04W 76/02 | 370/328 |
| 2007/0183460 A1 * | 8/2007 | Enders | H04B 3/542 | 370/503 |
| 2007/0226333 A1 * | 9/2007 | Morich | G06F 11/0709 | 709/224 |
| 2008/0018489 A1 * | 1/2008 | Kruest | G06K 7/0008 | 340/4.2 |
| 2009/0029663 A1 * | 1/2009 | Saban | H04B 7/12 | 455/208 |
| 2009/0262643 A1 * | 10/2009 | Zhao | H04L 12/423 | 370/217 |
| 2010/0292853 A1 * | 11/2010 | McDonnell | H02J 3/34 | 700/287 |
| 2011/0099414 A1 * | 4/2011 | Santos | H04L 12/437 | 714/4.11 |
| 2015/0076903 A1 * | 3/2015 | Kanayama | H02M 7/493 | 307/24 |

\* cited by examiner

SYSTEMS AND METHODS FOR MASTER ARBITRATION

CROSS REFERENCE TO RELATED APPLICATIONS

This application is a non-provisional application and claims priority to U.S. Provisional Patent Application Ser. No. 61/774,560 filed Mar. 7, 2013 for "POWER SYSTEM MASTER ARBITRATION", which is hereby incorporated by reference in its entirety.

BACKGROUND

The field of the invention relates generally to power systems, and more particularly, to master arbitration in power systems.

At least some known power systems include multiple, identical modules independently operating in a coordinated fashion to provide a system output. Certain system behaviors may need to be coordinated in response to external stimuli. This is generally accomplished by establishing a master module and synchronizing the remaining modules to the master module.

To establish a master module, at least some known power systems arbitrarily designate a master module and a backup module. However, if the master and backup modules are removed from such systems, it may be difficult to establish a new master module.

In at least some known power systems, an external device, such as an external controller, designates a master module. However, in such systems, the external controller is a single point of failure, and operation of such systems may be impacted if the external controller is damaged. Moreover, in at least some known power systems, a timing scheme is implemented in which modules attempt to take control after predefined intervals. However, using the timing scheme may result in a relatively long period of time passing before a master module is ultimately identified.

BRIEF DESCRIPTION

In one aspect, a power system is provided. The power system includes a communications bus and a plurality of modules communicatively coupled to the communications bus. Each of the plurality of modules is configured to continuously monitor the communications bus, transmit a modulated signal at a predetermined frequency when the module detects an incoherent signal on the communications bus, become a master module when the module detects a coherent signal at the predetermined frequency on the communications bus, and cease transmitting the modulated signal when the coherent signal is not detected after a period of time.

In another aspect, a module for use in a power system is provided. The module includes an input port, an output port, a synchronization port configured to communicatively couple the module to a communications bus, and a controller. The controller is configured to continuously monitor the communications bus, transmit a modulated signal at a predetermined frequency when the module detects an incoherent signal on the communications bus, become a master module when the module detects a coherent signal at the predetermined frequency on the communications bus, and cease transmitting the modulated signal when the coherent signal is not detected after a period of time.

In yet another aspect, a method for determining a master module for a plurality of modules that are each communicatively coupled to a communications bus is provided. The method includes detecting, using a module of the plurality of modules, an incoherent signal on the communications bus, transmitting, from the module, a modulated signal at a predetermined frequency in response to the detection of the incoherent signal, determining, using the module, whether a coherent signal at the predetermined frequency on the communications bus is detected within a period of time, designating the module as a master module when the coherent signal is detected within the period of time, and ceasing transmission of the modulated signal when the coherent signal is not detected within the period of time.

DETAILED DESCRIPTION

Exemplary embodiments of systems and methods for determining a master module in a power system are described herein. The systems and methods described herein use manipulation of a signaling bus coupled to all modules such that an intention to become the master module is clearly communicated. If multiple modules signal their intention to become the master module simultaneously, the modules detect this situation and take appropriate action to resolve the conflict and establish a master module.

Figure 1:
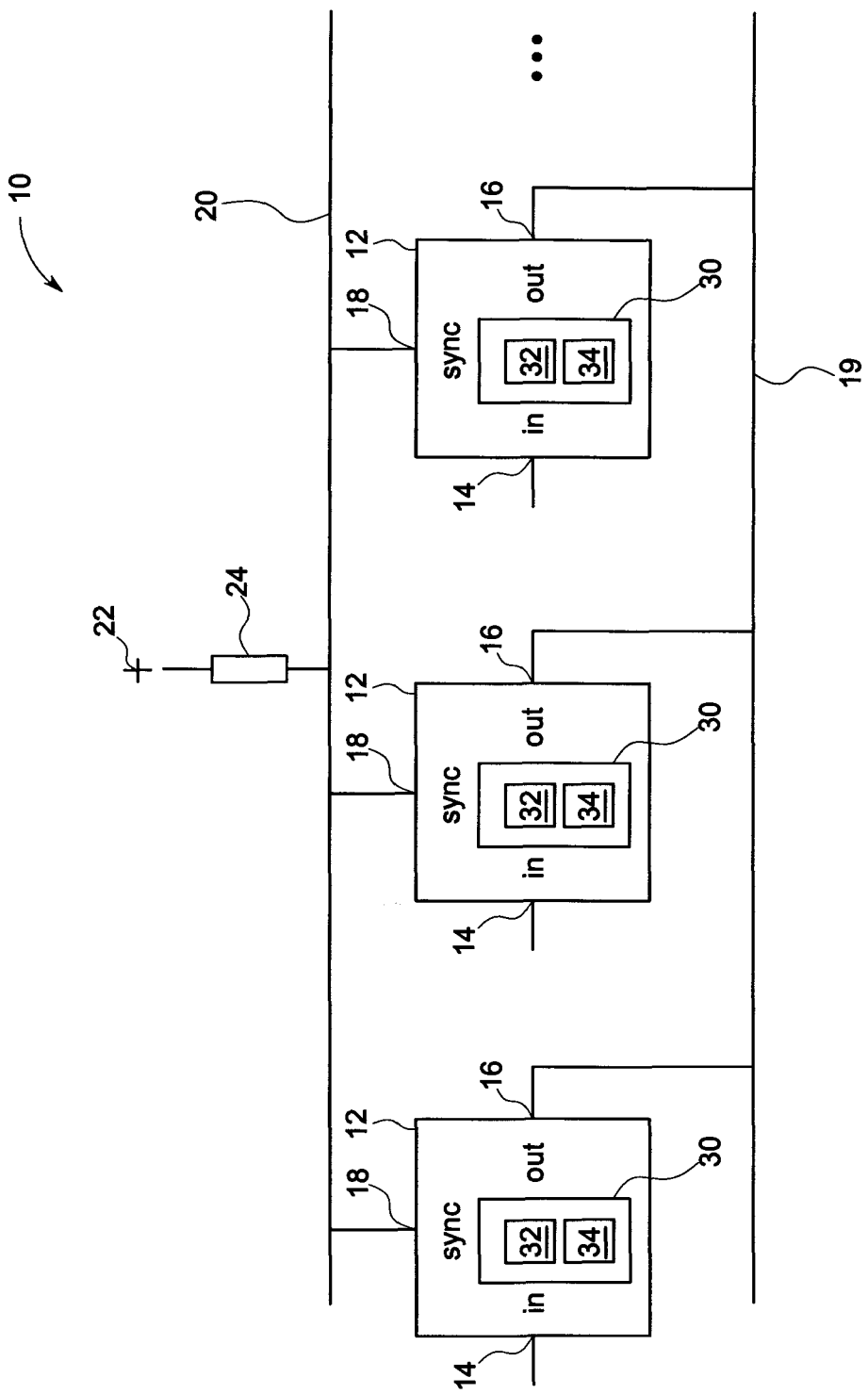
FIG. 1 is a schematic diagram of an exemplary power system.

FIG. 1 is a schematic diagram of an exemplary power system 10 that includes a plurality of modules 12 connected in parallel. Modules 12 may be any electronic devices that are configured to operate synchronously with one another. For example, in some embodiments, modules 12 are inverters that convert direct current (DC) to alternating current (AC).

In the exemplary embodiment, each module 12 includes an input port 14, an output port 16, and a synchronization port 18. Ports 14, 16, and 18 facilitate connecting module 12 to one or more devices and/or busses via a wired and/or wireless connection to facilitate operation of module 12. For example, in an embodiment where module 12 is a DC to AC inverter, input port 14 is configured to receive DC power and output port 14 is configured to output AC power. In the exemplary embodiment, modules are coupled in parallel such that output ports 16 are each electrically coupled to a system output bus 19.

Synchronization ports 18 of modules 12 facilitate synchronizing operation of modules 12. In the exemplary embodiment, each synchronization port 18 is electrically and communicatively connected to a communication bus 20 that facilitates communication between modules 12, as described in detail herein. Communication bus 20 is electrically coupled to a power source 22 through a pull-up resistor 24.

In the exemplary embodiment, communication bus 20 is a wire that functions as a DC bus. Specifically, at a given time, communication bus 20 may be in either in a high state (e.g., 5 Volts DC (VDC)) or a low state (e.g., 0 VDC or ground). Further, by alternating between the high and low states, a modulated signal is generated on communication bus 20.

Each module 12 includes a controller 30. In the exemplary embodiment, controller 30 is implemented by a processor 32 communicatively coupled to a memory device 34 for executing instructions. In some embodiments, executable instructions are stored in memory device 34. Alternatively, controller 30 may be implemented using any circuitry that enables controller 30 to control operation of an associated module 12 as described herein.

In the exemplary embodiment, controller 30 performs one or more operations described herein by programming processor 32. For example, processor 32 may be programmed by encoding an operation as one or more executable instructions and by providing the executable instructions in memory device 34. Processor 32 may include one or more processing units (e.g., in a multi-core configuration). Further, processor 32 may be implemented using one or more heterogeneous processor systems in which a main processor is present with secondary processors on a single chip. As another illustrative example, processor 32 may be a symmetric multi-processor system containing multiple processors of the same type. Further, processor 32 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 32 causes controller 30 to operate UPSs module 12, as described herein.

In the exemplary embodiment, memory device 34 is one or more devices that enable information such as executable instructions and/or other data to be stored and retrieved. Memory device 34 may include one or more computer readable media, such as, without limitation, dynamic random access memory (DRAM), static random access memory (SRAM), a solid state disk, and/or a hard disk. Memory device 34 may be configured to store, without limitation, application source code, application object code, source code portions of interest, object code portions of interest, configuration data, execution events and/or any other type of data.

Controllers 30 cause module 12 to manipulate communications bus 20 via synchronization ports 18, as described herein. Specifically, each module 12 can pull communications bus 20 down (i.e., pull communications bus 20 from the high state to the low state) at will. By alternately pulling down and releasing communications bus 20, a modulated signal is placed on communications bus 20. The modulated signal will have a frequency that depends on the rate at which communications bus 20 is pulled low and released. Accordingly, communications bus 20 may operate in the high state, the low state, or a modulated state (i.e., alternating between the high and low states).

Modules 12 manipulate communications bus 20 to determine which of modules 12 will become a master module. Once a master module is determined, as described herein, the remaining modules 12 are synchronized (e.g., in phase, frequency, and/or voltage) to the master module such that operation of each module 12 in power system 10 is coordinated.

In the exemplary embodiment, operating communications bus 20 in the low state for an extended period of time (i.e., without returning to the high state) indicates an emergency situation. Accordingly, when communications bus 20 operates in the low state for a predetermined time, controllers 30 cause modules 12 to engage in a synchronized emergency action (e.g., shutting down, switching to a backup mode of operation, etc.).

Operating communications bus 20 in the high state for an extended period of time (i.e., without returning to the low state) indicates that no module 12 is currently serving as the master module. In contrast, operating in a modulated state (i.e., alternating between the high and low states) with a coherent signal, as described herein, indicates that a master module is present. Under these circumstances, system 10 operates normally and may ready itself for an emergency situation in the event that communications bus 20 switches to the low state.

In the exemplary embodiment, communications on communications bus 20, and accordingly, the behavior of modules 12, are based on whether the signal on communications bus 20 is coherent, as described herein. As used herein, a signal is 'coherent' if multiple samples of activity on communications bus 20 indicate a signal with an unchanging frequency and a 50% duty cycle. All other conditions are considered an incoherent signal.

Figure 2:
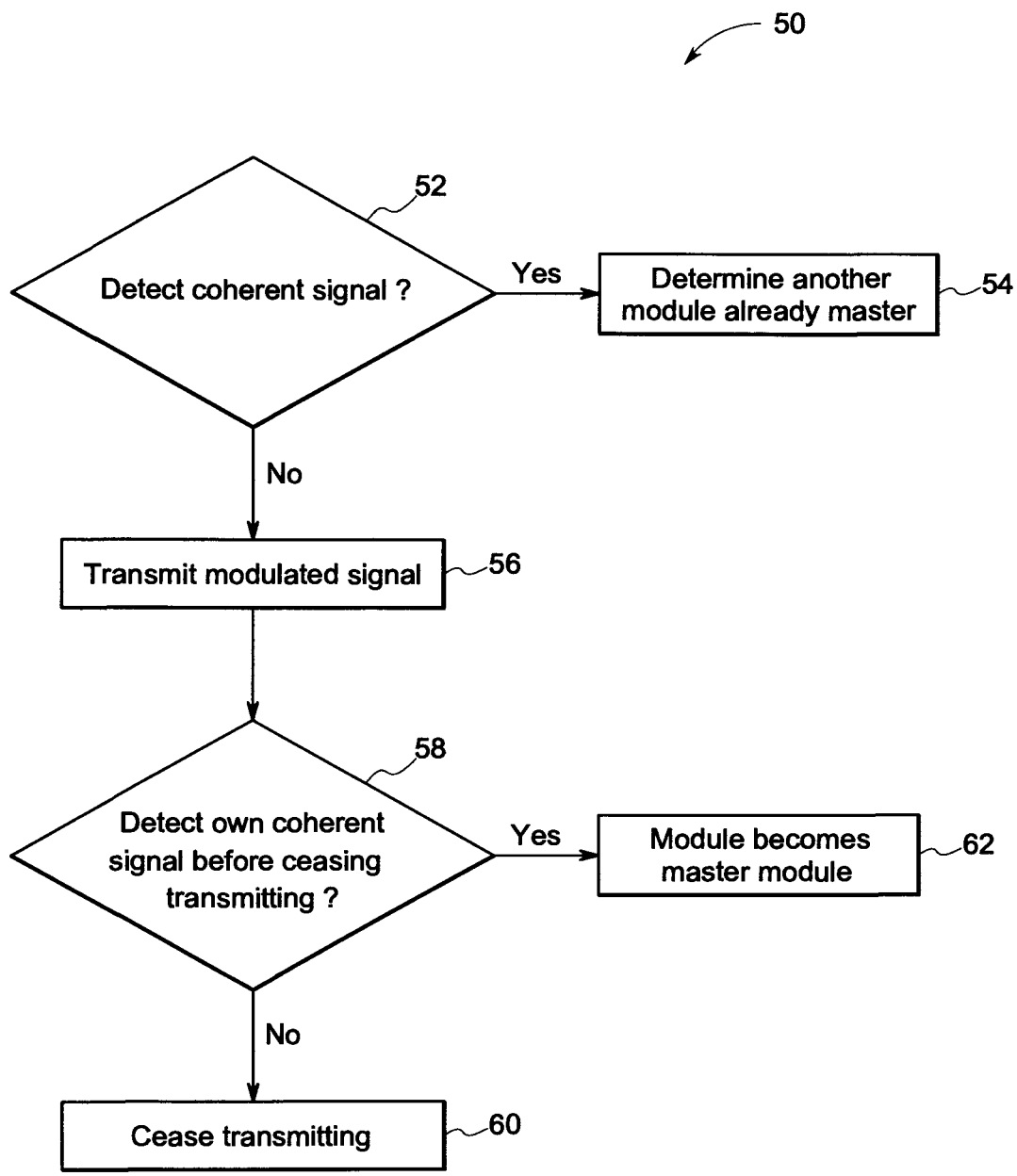
FIG. 2 is a flow diagram of an exemplary method that may be used with the system shown in FIG. 1.

FIG. 2 is a flow diagram of a method 50 of determining, or arbitrating, a master module. In the exemplary embodiment, to determine a master module, method 50 is performed by each module 12 in system 10. Unless indicated otherwise, controller 30 performs method 50. In the exemplary embodiment, method 50 is initiated when communications bus 20 is high.

At block 52, controller 30 monitors communications bus 20 to determine whether a coherent signal is on communications bus 20. In the exemplary embodiment, module 12, and accordingly controller 30, is always listening to communications bus 20. If a coherent signal is detected, flow proceeds to block 54, and module 12 begins normal operation and accepts that another module 12 is acting as the master module.

If no coherent signal is detected, flow proceeds to block 56, and module 12 begins transmitting a modulated signal at an arbitrary time. Accordingly, if the signal on communications bus 20 is incoherent, it means that multiple modules 12 are transmitting at the same time. To determine the master module, modules 12 randomly cease transmitting to communications bus 20. When only one module 12 remains transmitting, the signal becomes coherent, and that module 12 becomes the master module.

Accordingly, in method 50, once module 12 begins transmitting at block 56, module 12 continues to monitor communications bus 20 at block 58 before ceasing transmitting at block 60. If, at block 58, module 12 detects a coherent signal at its own frequency before ceasing transmitting, module 12 must be the only module 12 still transmitting, and that module 12 becomes the master module at block 62. Otherwise, if module 12 continues to detect an incoherent signal, module 12 ceases transmitting at block 60.

To aid detection of a coherent signal in method 50, each module 12 selects a unique and/or random frequency to transmit its respective modulated signal at. In the exemplary embodiment, the random frequency is limited to a predetermined frequency range (e.g., 20-30 kHz). As noted above, when module 12 detects a coherent signal at its own frequency on communications bus 20, that module 12 becomes the master module.

As explained above, after transmitting a signal at block 56, modules 12 eventually cease transmitting at block 60. In one embodiment, each module 12 uses a random number to determine whether or not to stop transmitting. Accordingly, modules 12 cease transmitting at a random time. Alternatively, the time at which modules 12 cease transmitting may be based on other parameters.

For example, in one embodiment, an address (e.g., the shelf/slot address) of a particular module 12 determines when the module 12 ceases transmitting. That is, the module 12 waits a predetermined amount of time before ceasing transmitting, and the predetermined amount of time is a function of the address. The higher the address (i.e., an eight bit value), the longer the module 12 waits until ceasing transmitting. Accordingly, as the lowered numbered modules 12 drop off of communications bus 20, eventually the highest numbered module 12 will be left transmitting and will become the bus master.

In an alternative embodiment, when a module 12 detects an incoherent signal at block 58, that module 12 immediately stops transmitting, and then resumes the master arbitration process a predetermined time later. The predetermined time may be based on, for example, the address of that module 12.

As indicated above, in some embodiments, modules 12 are DC/AC inverters in an inverter system. In such embodiments, there are two synchronization tasks that a master module may need to synchronize with the remaining modules 12. The first synchronization task is coordination of action of a static transfer switch within each DC/AC inverter. For the inverter system to operate properly, the static transfer switches in each module 12 must operate in a synchronized fashion. The second synchronization task for the inverter system is synchronizing the voltage, frequency, and phase of the output for each module 12.

To facilitate the synchronization tasks, the master module communicates with the remaining modules 12 via the communications bus 20 using two signals, an AC_SYNC signal and an STS_SYNC signal. In such an embodiment, communications bus 20 may include multiple communication lines (e.g., one line for master arbitration, one line for an AC_SYNC signal, and one line for an STS_SYNC signal). A low on the STS_SYNC signal indicates all modules 12 must trigger their static transfer switches. The AC_SYNC signal sets the inverter parameters (i.e., voltage, frequency, and phase), and only one module 12 (i.e., the master) can generate the AC_SYNC signal. The STS_SYNC signal may be used for master arbitration, as described above.

Figure 3:
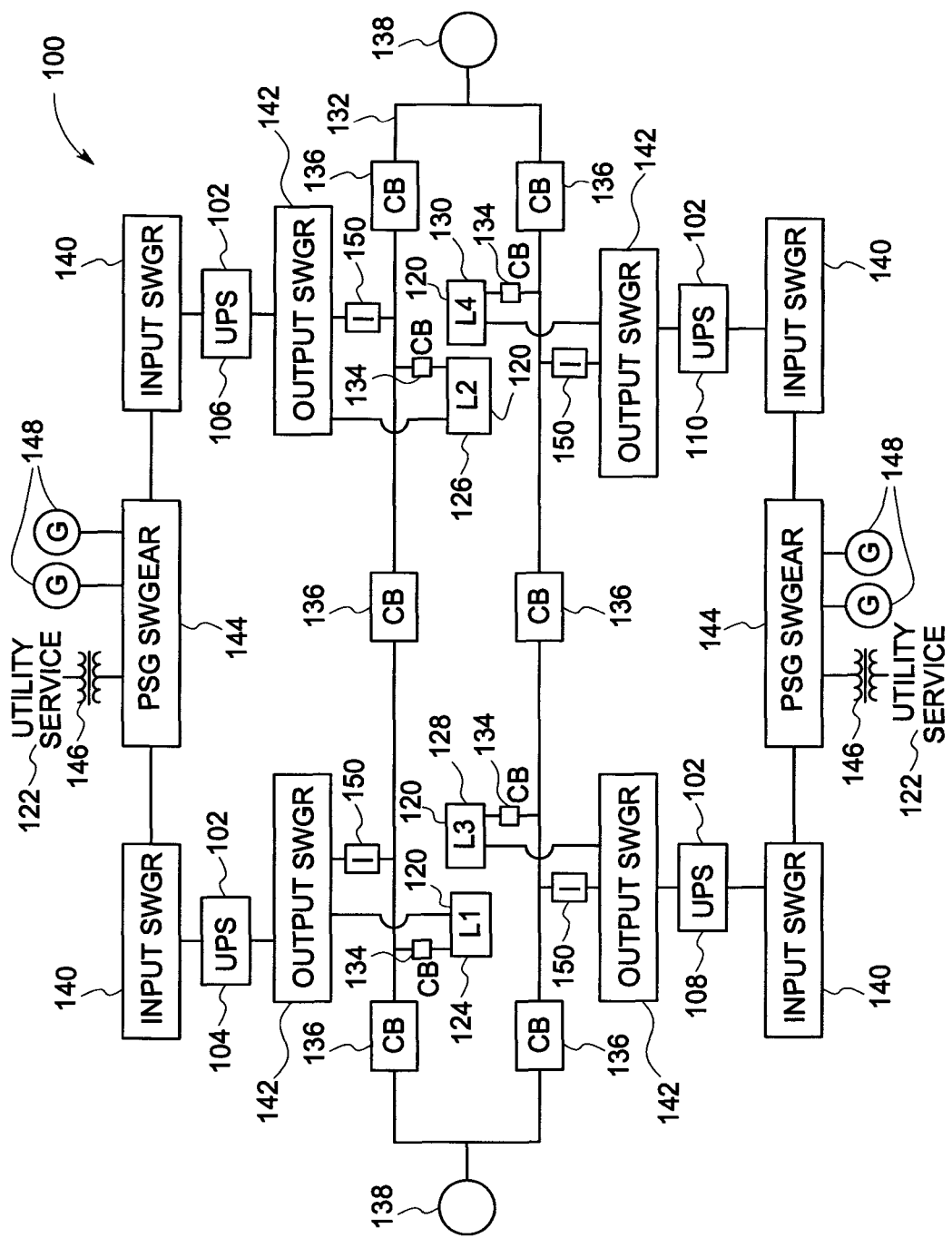
FIG. 3 is a schematic diagram of an exemplary power supply system.

The systems and method described herein may be implemented in other power systems as well. For example, FIG. 3 is a schematic diagram of an exemplary redundant isolated-parallel (IP) uninterruptible power supply (UPS) system 100 that may utilize the master arbitration techniques described herein.

System 100 includes a plurality of UPSs 102 arranged in a ring architecture, or parallel architecture. Specifically, system 100 includes a first UPS 104, a second UPS 106, a third UPS 108, and a fourth UPS 110 in the exemplary embodiment. Alternatively, system 100 may include any number of UPSs 102 that enable system 100 to function as described herein. System 100 facilitates providing power to one or more loads 120. Under normal operation, one or more utilities 122 function as a power source and provide power to loads 120. Utilities 122 may provide alternating current (AC) or direct current (DC) power to system 100. In the event that power from utilities 122 fails to reach loads 120 (e.g., due to a failure of utility 122 and/or devices between utility 122 and loads 120), system 100 utilizes UPSs 102 to keep power flowing to loads 120. In the exemplary embodiment, system 100 includes a first load 124, a second load 126, a third load 128, and a fourth load 130. Alternatively, system 100 may include any number of loads 120 that enable system 100 to function as described herein.

Each load 120 is electrically coupled between an associated UPS 102 and a ring bus 132. Specifically, in the exemplary embodiment, each load 120 is coupled to ring bus 132 via an associated load circuit breaker 134. Further, ring bus 132 includes a plurality of ring bus circuit breakers 136. In the event that any segment of ring bus 132 fails or is shut down, the architecture of system 100 ensures that power is still able to reach loads 120.

Each UPS 102 is electrically coupled between an input switchgear 140 and an output switchgear 142. Input switchgears 140 are electrically coupled to paralleling switchgears 144, which are in turn electrically coupled to utility 122 through an associated transformer 146. In the exemplary embodiment, each paralleling switchgear 144 is also electrically coupled to one or more grounds 148. Switchgears 140, 142, and 144 include may include local circuits, remote synchronization circuits, and/or software to facilitate attenuating disturbances, interference, and/or crosstalk on ring bus 132 to provide clean power to loads 120. In the exemplary embodiment, each output switchgear 142 is electrically coupled directly to an associated load 120, and coupled to ring bus 132 through an associated choke 150 (e.g., an inductor).

In system 100, without proper synchronization, UPSs 102 may interfere with one another and/or start to override one another, causing oscillations or other undesirable effects. Accordingly, to avoid potential interference and/or collisions, a control device (not shown) may be located at each choke 150 or output switchgear 142. The control devices function as modules 12 (shown in FIG. 1), and may perform the arbitration processes described herein to determine a master controller that will dictate operation of the remaining controllers. In such an embodiment, the arbitration process may take into account time delays over relatively long power cables, with such time delays being calculated upon startup of system 100.

The systems and methods described herein may also be used in an energy grid system that includes DC and AC power sources that supply power to a network. DC power sources could include, for example, solar energy systems or biofuel systems. The DC power sources may supply power to the network through rectifiers, and the AC power sources may supply power to the network through switchgears. To avoid potential interference and/or collisions, a plurality of controllers may control operation of one or more components of the energy grid system, with a master controller being determined using the arbitration processes described herein. This could be implemented across a localized power system and/or across a global power system.

As compared to at least some known power systems, the systems and methods described herein utilize a single communication line to identify whether a master module is available, arbitrate selection of a new master module, and indicate an emergency situation requiring coordinated action. After a previous master module is removed from the system, all remaining modules are able to vie for being the new master module. Further, the continuous monitoring of a communication bus by the modules facilitates rapid coordinated action, rapid initiation of a master module determination process, and rapid determination of a master module based on coherent and incoherent bus signals. Moreover, reliability is improved over at least some known power systems because any and every module is capable of become the master module and coordinating activity of the system.

Exemplary embodiments of systems and methods for master arbitration are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power system comprising:
   a communications bus; and
   a plurality of modules communicatively coupled to said communications bus, wherein each of said plurality of modules is configured to:
   continuously monitor the communications bus for presence of a coherent signal, wherein a signal is coherent when multiple samples of signal activity indicate an unchanging frequency and a 50% duty cycle;
   transmit a modulated signal at a unique predetermined frequency when said module detects an incoherent signal on said communications bus;
   become a master module when said module detects a coherent signal at the unique predetermined frequency on said communications bus, wherein the detection of a coherent signal indicates that said module is the only module of said plurality of modules transmitting the modulated signal; and
   cease transmitting the modulated signal when the coherent signal is not detected after a period of time.

2. A power system in accordance with claim 1, wherein the period of time is a random period of time.

3. A power system in accordance with claim 1, wherein the period of time is based on an address of said module.

4. A power system in accordance with claim 1, wherein each of said plurality of modules comprises a DC to AC inverter.

5. A power system in accordance with claim 1, wherein each of said plurality of modules is further configured to engage in a synchronized action when said module detects operation of said communications bus in a low state for a predetermined period of time.

6. A power system in accordance with claim 1, wherein to transmit a modulated signal at a predetermined frequency, each of said plurality of modules is configured to transmit a modulated signal at a predetermined frequency that is unique to said module.

7. A power system in accordance with claim 1, wherein to cease transmitting the modulated signal, each of said plurality of modules is configured to cease transmitting the modulated signal immediately after a failure to detect the coherent signal.

8. A power system in accordance with claim 1, wherein said communications bus comprises a DC bus.

9. A module for use in a power system, said module comprising:
   an input port;
   an output port;
   a synchronization port configured to communicatively couple said module to a communications bus; and
   a controller configured to:
   continuously monitor the communications bus for presence of a coherent signal, wherein a signal is coherent when multiple samples of signal activity indicate an unchanging frequency and a 50% duty cycle;
   transmit a modulated signal at a predetermined frequency when said module detects an incoherent signal on the communications bus;
   become a master module when said module detects a coherent signal at the predetermined frequency on the communications bus, wherein the detection of a coherent signal indicates that said module is the only module of said plurality of modules transmitting the modulated signal; and
   cease transmitting the modulated signal when the coherent signal is not detected after a period of time.

10. A module in accordance with claim 9, wherein the period of time is a random period of time.

11. A module in accordance with claim 9, wherein the period of time is based on an address of said module.

12. A module in accordance with claim 9, wherein said module comprises a DC to AC inverter.

13. A module in accordance with claim 9, wherein said module is further configured to engage in a synchronized action when said module detects the communications bus is operating in a low state for a predetermined period of time.

14. A module in accordance with claim 9, wherein to transmit a modulated signal at a predetermined frequency, said module is configured to transmit a modulated signal at a random frequency between 20 and 30 kHz.

15. A module in accordance with claim 9, wherein to cease transmitting the modulated signal, said module is configured to cease transmitting the modulated signal immediately after a failure to detect the coherent signal.

16. A method for determining a master module for a plurality of modules that are each communicatively coupled to a communications bus, said method comprising:
   continuously monitoring the communications bus for presence of a coherent signal, wherein a signal is coherent when multiple samples of signal activity indicate an unchanging frequency and a 50% duty cycle;
   detecting, using a module of the plurality of modules, an incoherent signal on the communications bus;

transmitting, from the module, a modulated signal at a predetermined frequency in response to the detection of the incoherent signal;

determining, using the module, whether a coherent signal at the predetermined frequency on the communications bus is detected within a period of time;

designating the module as a master module when the coherent signal is detected within the period of time, wherein the detection of a coherent signal indicates that said module is the only module of said plurality of modules transmitting the modulated signal; and ceasing transmission of the modulated signal when the coherent signal is not detected within the period of time.

17. A method in accordance with claim 16, wherein determining whether a coherent signal is detected within a period of time comprises determining whether a coherent signal is detected within a random period of time.

18. A method in accordance with claim 16, wherein determining whether a coherent signal is detected within a period of time comprises determining whether a coherent signal is detected within a period of time that is based on an address of the module.

19. A method in accordance with claim 16, further comprising engaging in a synchronized action when the module detects operation of the communications bus in a low state for a predetermined period of time.

20. A method in accordance with claim 16, wherein transmitting a modulated signal comprises transmitting a modulated signal at a predetermined frequency that is unique to the module.

* * * * *